Figure 1:
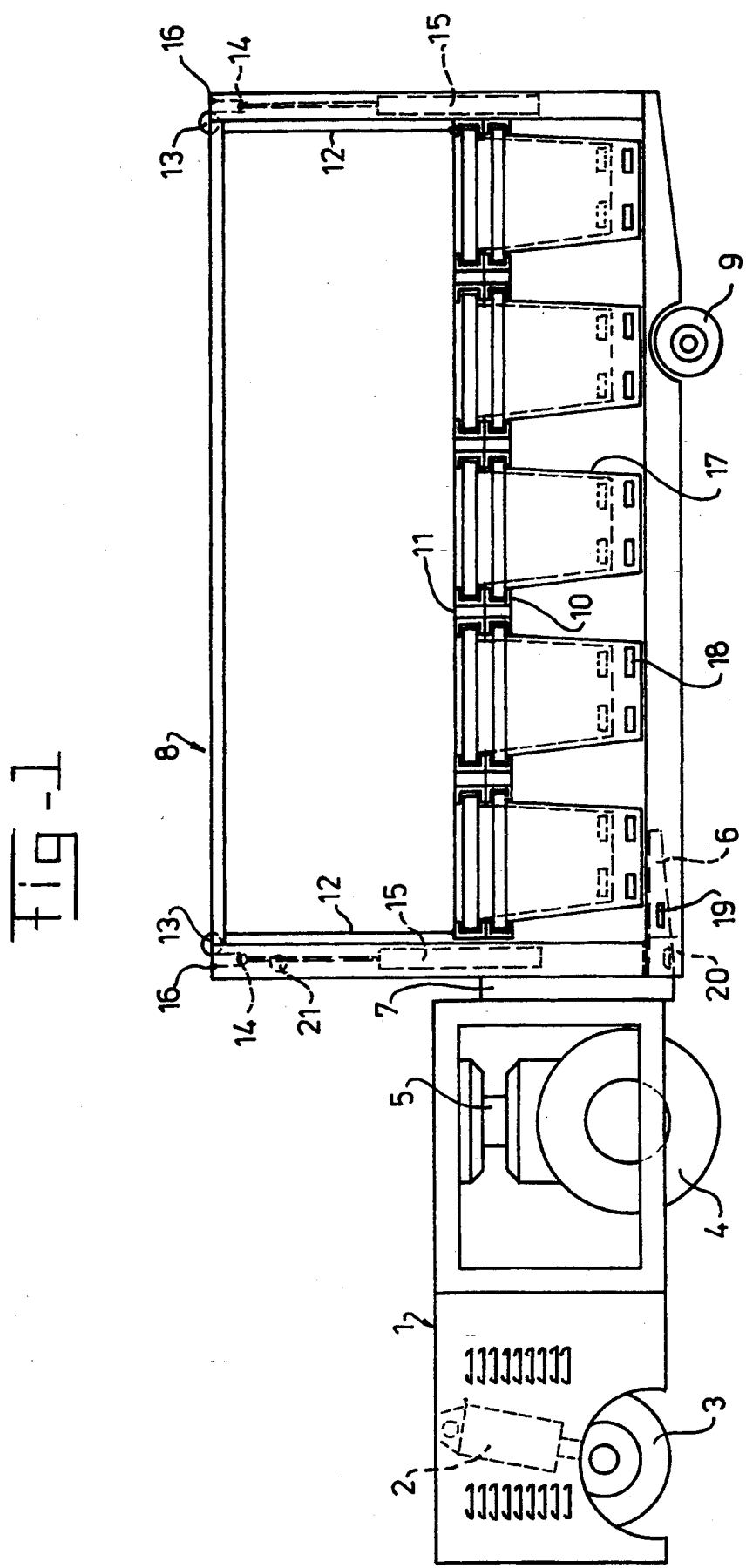

United States Patent [19]
Nijenhuis

[11] Patent Number: 5,401,137
[45] Date of Patent: Mar. 28, 1995

[54] DEVICE FOR THE COLLECTION OF DOMESTIC REFUSE OR THE LIKE

[75] Inventor: Derk Nijenhuis, Hoogeveen, Netherlands

[73] Assignee: N.C.H. Hydraulische Systemen B.V., Hoogeveen, Netherlands

[21] Appl. No.: 39,226

[22] PCT Filed: Oct. 11, 1991

[86] PCT No.: PCT/NL91/00197
§ 371 Date: Jun. 1, 1993
§ 102(e) Date: Jun. 1, 1993

[87] PCT Pub. No.: WO92/06906
PCT Pub. Date: Apr. 30, 1992

[30] Foreign Application Priority Data
Oct. 11, 1990 [NL] Netherlands .................. 9002216

[51] Int. Cl.⁶ .................. B60P 1/02; B65G 67/02
[52] U.S. Cl. .................. 414/679; 414/495; 294/68.3
[58] Field of Search .................. 294/68.1, 68.3, 87.1; 414/391, 399, 495, 496, 608, 788.2, 789.7, 679

[56] References Cited

U.S. PATENT DOCUMENTS

| | | | |
|---|---|---|---|
| 2,685,398 | 8/1954 | King | 414/608 X |
| 3,643,993 | 2/1972 | Asadurian | 414/608 X |
| 3,760,966 | 9/1973 | Jones, Jr. et al. | 294/87.1 X |
| 3,870,339 | 3/1975 | Goff | 414/495 X |
| 5,096,216 | 3/1992 | McCalla | 414/495 X |

FOREIGN PATENT DOCUMENTS

| | | | |
|---|---|---|---|
| 759768 | 2/1934 | France . | |
| 1502834 | 11/1967 | France . | |
| 2330612 | 6/1977 | France . | |
| 418305 | 9/1925 | Germany . | |
| 187670 | 8/1987 | Japan | 414/495 |
| 347379 | 4/1931 | United Kingdom . | |

*Primary Examiner*—Dean J. Kramer
*Attorney, Agent, or Firm*—Bachman & LaPointe

[57] ABSTRACT

A device for the collection of domestic refuse and similar materials, comprising a number of containers which are fitted in at least one upper layer positioned above at least one lower layer. The containers in the upper layer are accommodated in a support which can be moved up and down. The containers are formed in such a way that in a lower position of the upper support, the containers of the top layer project into the containers of the layer lying below. Accordingly, the containers of each layer can be filled easily by hand while they are in the device.

4 Claims, 2 Drawing Sheets

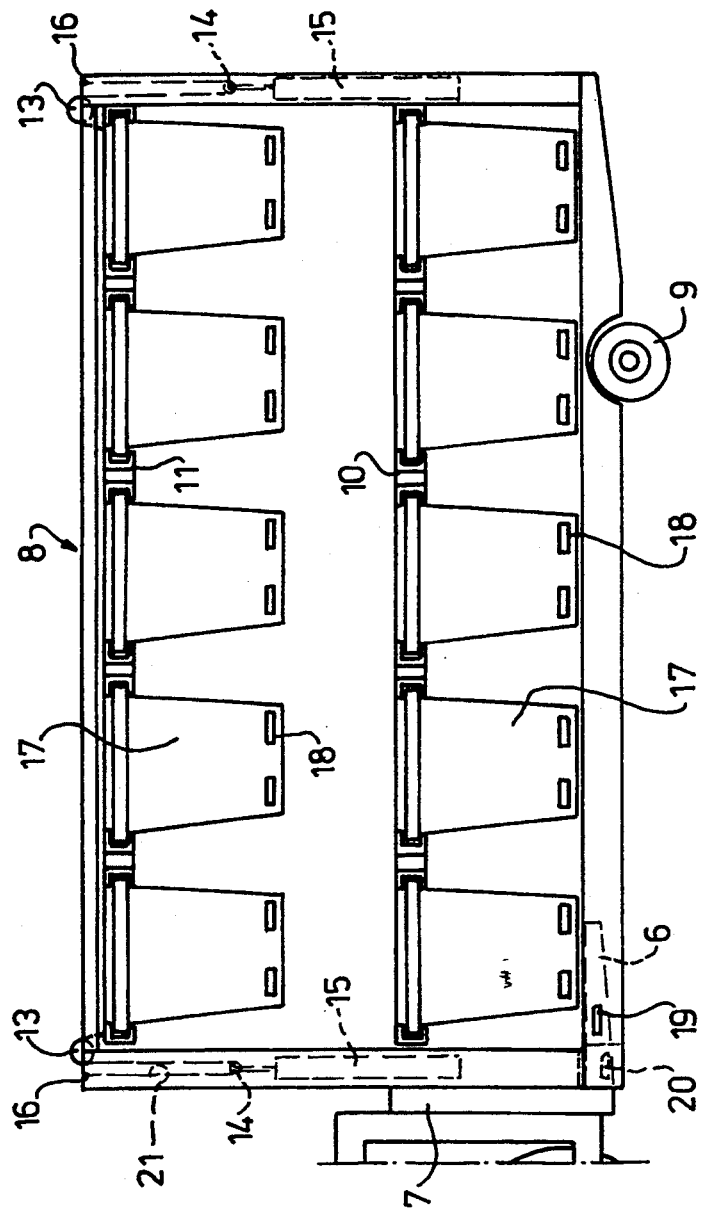

DEVICE FOR THE COLLECTION OF DOMESTIC REFUSE OR THE LIKE

The invention relates to a device for the collection of domestic refuse and similar materials, comprising a number of containers which are disposed in layers above one another, the containers in each layer being accommodated in a support which can be moved up and down.

Such a device is known from FR-A-759,768. The device described therein, which is in the form of a lorry, can be loaded with containers in two layers. The top layer of containers is in this case placed on a support which can be moved up and down. During the loading, this support is placed initially in the lowest position, and containers are placed thereon. The support is then moved up, following which containers can again be placed below it. The operation is the reverse for unloading. In this way a lorry can be loaded with two layers of containers with less work involved.

The disadvantage is that in the case of the device according to FR-A-759,768 the containers in the bottom layer have to be removed before the containers in the top layer can be lowered. Such a device is therefore not suitable if, for example, the containers are intended to be filled while they are already situated in the device. Such a possibility is required, for example, for the increasingly common separate collection of different types of domestic refuse. The domestic refuse supplied, for example, by the different households in one street is in this case pre-sorted and emptied in small quantities into the containers situated in the device. This emptying is carried out mainly by hand, and the height of the containers above the ground therefore has to be as low as possible. In order still to obtain a sufficient degree of loading of the device, it is desirable to store containers therein in several layers. For good working it is in this case not admissible for containers to have to be placed outside the device during the filling.

The object of the invention is to solve the problem described above. For this purpose, a device of the type mentioned above is provided, in which the containers are shaped in such a way that in the low position of the support the containers of a top layer project into the containers of the layer below them.

In this way all containers can be filled by hand from the ground, without any of them having to be removed from the device, and without the workload of the workers being increased in the process.

For example,, the containers can flare out from the bottom upwards, as a result of which they can nest easily.

For a further handling of %he containers, for example for emptying them, it is preferable for the support to be formed in such a way that the containers accommodated by it can be moved out of it and placed in it laterally, thus at right angles to the up and down movement of the support. For example, the containers for this purpose can have at their top end projecting parts with which they can rest on parts of the support, so that they are carried by it.

For easy emptying, the containers can have near their bottom means for gripping them with mechanical means, in order to be able to tilt them through approximately 180°.

The invention will now be explained in greater detail by the description which follows of an example of an embodiment of the most important parts of the device for the invention shown in the drawings. In these drawings:

FIG. 1 shows a somewhat schematic side view of a trailer with tractor and containers according to the invention; and FIG. 2 shows a side view of said trailer with separate layers for the containers.

A tractor 1 has a front axle which can be lifted, for example by means of a hydraulic cylinder 2, said axle having two wheels 3, one on each side of the vehicle, with its own drive motor between the wheels 3 for a single rear wheel 4 in the centre, controllable by rotation about the vertical shaft 5. Behind that, said tractor has on each side a fork tooth 6, connected by lifting means at 7 to the tractor 1, and serving for coupling to a trailer 8 to be described below. Other coupling means could also be used, for example a tow hook which absorbs vertical forces, and which is possibly vertically displaceable. The tractor 1 can be provided without cab and can have control means for travelling, braking and swivelling of wheel 4 at one or at both sides, so that operating personnel can control it while walking beside the tractor. The teeth 6 only need to be able to move up and down over a short distance. They can be provided so that they swing away or are retractable, in order to ensure that they project less when the tractor is travelling separately along the road.

A trailer 8 has a chassis which is essentially open particularly in the side faces, and has a set of wheels 9 near the rear end. Two frames 10 and 11 are disposed one above the other in the chassis of trailer 8, of which frame 10 can be fixed and frame 11 is vertically movable therein, for example on cables 12 on the front and rear side, which run to a fixed point 16 in the top of the trailer by means of fixed cable pulleys 13 in the top of the trailer and cable pulleys 14 each fitted on a piston rod of a hydraulic or pneumatic cylinder 15. The frame 11 can thereby make a stroke twice that of the cylinders 15. Of course, other lifting means can also be used for said frame 11, for example with lead screws, with rotary winch drums for the cables 12, or something else.

The frames 10 and 11 have a longitudinal bar running in the longitudinal centre of the trailer 8, and from said longitudinal bar transverse bars running to each side, which bars are not interconnected any further, so that containers 17 with outward projecting top edges can be slid laterally in and out thereof, as yet to be described.

The containers 17 can serve to take widely differing types of separately collected domestic refuse, and can be clearly marked for this purpose, for example can be differently coloured from each other, through selection of their material or by painting. The containers flare out towards the top, so that they can nest in each other (FIG. 1).

They have at their bottom end a double bottom with two sockets 18 to take the teeth of a forklift truck.

The trailer 8, filled with empty containers 17, nested in each other as shown in FIG. 1, can be deposited at any desired point by a tractor 1, for example at night in an area where domestic refuse has to be collected the next day. When it arrives there, the fork teeth 6 of the tractor can be moved downwards with the device 7 until the trailer is resting with that end on the ground, and the tractor 1 can now be uncoupled from the trailer and can go and fetch another trailer.

For the collection of domestic refuse, a tractor is again coupled to the trailer 8, the teeth 6 are inserted in their lowest position into the sockets of the trailer and raised to the position shown in FIGS. 1 and 2, and the tractor 1 is coupled to the trailer 8 by means not shown. The trailer 8 is now moved like this at walking pace through the area. Separately supplied different types of domestic refuse are emptied into the containers 17, and here they may or may not be packed in bags which can, for example, be marked according to type with the same colors as the containers. Rough sorting on the spot by the personnel operating the tractor and trailer is also possible. For suppliers of larger quantities of domestic refuse or the like, for example hotels, hospitals etc., complete containers 17 can be left there, and an empty container 17 (or two containers nested in each other) can be moved laterally out of the frame 10 and/or 11 and left behind there, while a full container is placed from the side in the space in the trailer which has become vacant. When containers are nested in each other as shown in FIG. 1, two empty containers nested in each other can be removed simultaneously from the trailer and a full container first placed in frame 11, after which a full container can be passed to frame 10 later when frame 11 has been lifted (position of FIG. 2). In this way the containers placed in the top frame 11 are filled first. Since the latter frame is in the lowest position, the open top surface of the containers 17 in this frame can be reached without difficulty for filling.

When these containers are completely or sufficiently filled, the hydraulic cylinders 15 are operated to retract their piston rods, in which case the frame 11 with containers 17 therein is moved from the position shown in FIG. 1 to that shown in FIG. 2. The containers 17 in frame 10 are thus freed for filling. After these have also been filled to a sufficient degree, the tractor 1 takes the trailer 8 to a suitable parking place in the area, where the fork teeth 6 are moved downwards until the trailer 8 is resting with the front end on the ground, after which the tractor 1 is uncoupled from the trailer and can be coupled to another trailer 8 for collecting domestic refuse therewith.

The trailer 8 is taken up at a suitable moment on a lorry chassis, for example of a type such as that indicated in EP-B-151,635, in Dutch Patent Specification 128,236, in British Applications 1,234,147 and 1,385,997, in DE-A-2,248,350, and in many other places in literature in this field. Said lorry chassis in this case has one or more types of means for pulling containers onto a loading platform thereof and depositing them from it, for example by means of winches and cables, with a swivelling central hook or with grippers in corner castings of so-called sea containers, in which case said loading platform can be in the form of a tipping bridge, which is tiltable about a horizontal axis at the rear of the lorry, with a telescopic part which can be extended to the ground when the tipping bridge is placed at an angle, in order to pull a container onto or deposit At smoothly from said bridge. For this, FIGS. 1 and 2 show three possibilities, but only one need be used if the same type of lorry for accommodating the trailers is always used.

Reference number 19 indicates how hooks for taking cable eyes on cables can be present, each running from a winch of the lorry, and each at one side of the trailer projecting outwards from the lower chassis bar of the lorry. Such a cable is then hooked on each side of the lorry on said hook 19, following which the trailer can be pulled onto the lorry through operation of the winches.

Reference number 20 indicates how the trailer can have corner castings which An the usual manner have vertical slits in their front and side face, in which, for example, oval grippers fitted on a mobile trolley which can travel over the telescopic part of the tipping bridge can be provided, which trolleys can be locked with the corner castings An the usual manner through rotation through 90°, An order to pull the trailer 8 thereon through travelling of said trolley on the tipping bridge.

Reference number 21 indicates how the trailer 8 can have a horizontal pin An the front face in the center thereof in a niche, on which pin a hook which is situated on an arm on the lorry can engage, which arm can be swivellable and/or displaceable on the lorry by a trolley which can travel over the tipping bridge or the telescopic part thereof.

The above-mentioned literature gives sufficient details of all kinds of possibilities, so that reference is made thereto.

Once placed on the lorry, in which case a second filled trailer 8 can be pulled onto a trailer of said lorry by the same means, but now fitted on said trailer, being cables with winches, hooks or grippers for corner castings, the lorry is driven to a place where the containers 17 can be emptied. This can be carried out while the trailer 8 is still on the lorry, but it is preferable for the trailer 8 robe deposited there by the lorry, after which the lorry can be used directly for other purposes, for example for picking up another trailer 8 with empty containers 17, for the purpose of taking it to a place where a tractor 1 can again take it through an area for the collection of domestic refuse.

The containers 17 are now removed laterally from the trailer 8. A forklift truck can in this case grip with its fork teeth into the sockets 18 of each container, for the purpose of lifting the latter slightly and then sliding it out of its frame 10 or 11. Such a forklift truck can have its teeth on a liftable carrier which is rotatable about a horizontal axis, as already described, so that at a dumping ground, for example above a silo or displaceable collection container by means of which the refuse is conveyed to a processing, burning or further sorting device, the container 17 can be tilted for emptying.

In the case of two layers such as shown in FIGS. 1 and 2 one or more forklift trucks can remove the containers 17 first from frame 10, following which frame 11 is lowered in the manner described to the position shown in FIG. 1, after which forklift trucks remove the containers 17 laterally from frame 11, so that said forklift trucks do not have to reach high.

The means further needed to operate the system are not detailed, but are very well known and give the expert no problems. For example, cylinders 15 (which could be replaced by electrical, pneumatic or mechanical means) can take their energy from the power source in the tractor 1, which power source can not only handle the driving of wheel 4 thereof, but can also drive a pump, compressor or dynamo to energize means such as 15, while an electrical connection from tractor 1 can, for example, provide rear lighting of the trailer 8. All kinds of coupling and locking means are not shown in detail or discussed either. The trailer 8 could also have two pairs of wheels at a distance, so that the coupling means do not need to move up and down.

The tractor 1 can have an electric or hydro-electric drive for wheel 4, for example fed by batteries, and wheel 4 could swivel through 180° about shaft 5, so that no reverse circuit for the drive thereof is needed.

The containers 17 can have any desired capacity, for example between 1 and 4 m³. The drive capacity for tractor 1 can, of course, be very much lower than that of the lorries which have to pick up the trailers 8 and convey them over a greater distance, in view of the low speed, and can also be very much lower than the capacity required for conventional refuse collection vehicles.

I claim:

1. A garbage truck for the collection and separation of domestic refuse, comprising:
    a plurality of layers of containers including at least one upper layer disposed above at least one lower layer, wherein the containers are shaped such that the containers forming the upper layer are adapted to nest in the containers forming the lower layer, wherein the containers are open at a top end and flare out from a bottom end in an upward direction;
    lower support means for securing the containers of the lower layer; and
    movable upper support means for securing the containers of the upper layer in alignment with the containers in the lower layer and for moving the upper layer to a lower position wherein the containers become nested with the containers of the lower layer and into an upper position wherein the containers become vertically separated for allowing access to the lower layer, wherein the containers comprising the upper and lower layers are carried on the upper and lower support means at their top ends.

2. The truck according to claim 1, wherein the lower support means has a lower support end positioned substantially adjacent to ground level such that the lower layer of the containers and the upper layer of containers in the nested position are positioned at a height easily accessible for refuse input from ground level in a direction substantially perpendicular to the top end, wherein the upper layer of containers can be moved to the lower position without removing the lower layer of containers.

3. The truck according to claim 2 wherein the containers are adapted to be filled by an individual having a height and standing in a position substantially at ground level, wherein the lower support end supports the containers by the bottom end thereof and is adapted to be positioned sufficiently close to ground level to cause the open top end of the containers of the lower layer and the nested upper layer to be accessible from the standing position on ground level so that the individual does not need to lift the refuse above its height to fill the containers.

4. A method for the collection and separation of domestic refuse, comprising the steps of:
    providing a frame including a plurality of layers of containers, having at least one upper layer disposed above at least one lower layer, wherein the containers have an open top end and are shaped such that the containers forming the upper layer are adapted to nest in the containers forming the lower layer, the containers in the upper layer being movable into a lower position wherein the containers become nested with the containers of the lower layer and to an upper position wherein the containers in the upper layer become vertically separated from the containers of the lower layer;
    positioning the upper layer of containers relative to the lower layer of containers such that the upper layer of containers are nested with the lower layer of containers;
    inputting refuse into the containers of the upper layer until they are filled with sufficient degree; and
    moving the upper layer via the movable support to a position wherein the containers in the upper layer are vertically separated such that the open top ends of the lower layer of containers are accessible for the input of refuse.

* * * * *